United States Patent

Shiraishi et al.

[11] Patent Number: 6,143,691
[45] Date of Patent: Nov. 7, 2000

[54] PURIFYING CATALYST FOR EXHAUST GAS FROM INTERNAL COMBUSTION ENGINE

[75] Inventors: Eiichi Shiraishi; Shigeyoshi Taniguchi; Takeshi Matsumoto, all of Hyogo-ken, Japan

[73] Assignees: ICT Co., Ltd, Osaka, Japan; International Catalyst Technology, Inc., Ridgefield Park, N.J.

[21] Appl. No.: 08/773,410

[22] Filed: Dec. 27, 1996

[30] Foreign Application Priority Data

Dec. 27, 1995 [JP] Japan .................................. 7-341126
Dec. 28, 1995 [JP] Japan .................................. 7-343778

[51] Int. Cl.⁷ ................................................ B01J 23/10
[52] U.S. Cl. ..................... 502/304; 502/333; 423/213.5
[58] Field of Search ............................. 502/302, 527, 502/303, 304, 213, 333; 423/213.5

[56] References Cited

U.S. PATENT DOCUMENTS

| | | | |
|---|---|---|---|
| 4,624,940 | 11/1986 | Wan | 423/213.5 |
| 5,212,142 | 5/1993 | Dettling | 502/304 |
| 5,286,699 | 2/1994 | Ohata et al. | 502/304 |
| 5,376,610 | 12/1994 | Takahata et al. | 502/304 |
| 5,741,467 | 4/1998 | Williamson et al. | 423/213.5 |
| 5,753,580 | 5/1998 | Hayashi | 423/213.5 |

FOREIGN PATENT DOCUMENTS

| | | |
|---|---|---|
| 0507590 | 4/1992 | European Pat. Off. . |
| 62-068545 | 3/1987 | Japan . |
| 63-104651 | 5/1988 | Japan . |
| 4284847 | 3/1991 | Japan . |
| 05-237383 | 9/1993 | Japan . |
| 07171392 | 7/1995 | Japan . |
| 9500235 | 1/1995 | WIPO . |
| 9535152 | 12/1995 | WIPO . |

OTHER PUBLICATIONS

European Search Report, EP 96 12 0892, Jun. 3, 1997.

*Primary Examiner*—Steven P. Griffin
*Assistant Examiner*—Peter DiMauro
*Attorney, Agent, or Firm*—Omri M. Behr, Esq.

[57] ABSTRACT

A purifying catalyst for the exhaust gas from the internal combustion engine of an automobile, for example, is disclosed which excels in the purifying ability in quick response to the atmosphere of the exhaust gas largely varying with changes in the operating condition of the engine involving such phases as idling, acceleration, constant-speed drive, and deceleration. The purifying catalyst contains rhodium, palladium, a cerium compound, and a refractory inorganic oxide as catalytic components carried on a refractory carrier and comprises at least two catalyst layers, namely a catalyst layer containing the cerium compound and a catalyst layer containing palladium.

11 Claims, No Drawings

PURIFYING CATALYST FOR EXHAUST GAS FROM INTERNAL COMBUSTION ENGINE

BACKGROUND OF THE INVENTION

1. Field of the Invention

This invention relates to a purifying catalyst for the exhaust gas from an internal combustion engine which deprives the exhaust gas simultaneously of the harmful components, i.e. carbon monoxide (CO), hydrocarbon (HC), and nitrogen oxides ($NO_x$).

2. Description of the Prior Art

In such purifying catalysts for the exhaust gas from the internal combustion engine of an automobile, for example, as are intended to effect simultaneous removal of the harmful components of the exhaust gas, i.e. CO, HC, and $NO_x$, such platinum metals as platinum, palladium, rhodium, and iridium are generally used as an active component. The catalysts which are formed of platinum/rhodium, platinum/palladium/rhodium, palladium/rhodium, and palladium alone are now in popular use. Many inventions directed to imparting improved heat resistance to the precious metal-containing purifying catalysts for the exhaust gas from an internal combustion engine have been proposed (JP-A-04-219140, JP-A-04-284847, JP-07-171392, etc.).

While the internal combustion engine of an automobile is driven, the driving condition of the engine of automobile frequently changes from idling to acceleration, from acceleration to constant-speed drive, from constant-speed drive to deceleration, or from constant-speed drive to acceleration. The atmosphere of the exhaust gas from the internal combustion engine is largely varied as a result. When the ability of the purifying catalyst at the reaction variable filed as implied above is studied in detail, the results hardly justify the conclusion that the conventional purifying catalysts for the exhaust gas from an internal combustion engine manifest a fully satisfactory purifying ability and that they respond fully satisfactorily to the purification of $NO_x$ in particular.

An object of this invention, therefore, is to provide a novel purifying catalyst for the exhaust gas from an internal combustion engine.

Another object of this invention is to provide a purifying catalyst for the exhaust gas from the internal combustion engine such as of an automobile which excels in the ability to respond quickly to the atmosphere of the exhaust gas varying greatly with the changes in the driving condition of the engine involving such phases as idling, acceleration, constant-speed drive, and deceleration, particularly a purifying catalyst for the exhaust gas from the internal combustion engine which excels in the ability to respond quickly to the purification of $NO_x$.

We have pursued a diligent study on the purifying catalysts for the exhaust gas from an internal combustion engine to learn that a purifying catalyst for the internal combustion engine exhaust gas which is possessed of a plurality of catalyst layers comprising a specific combination of platinum metals, a cerium compound, and a refractory inorganic oxide excels in the ability to respond quickly to the changes in the atmosphere of the exhaust gas. The present invention has been perfected as a result.

SUMMARY OF THE INVENTION

The objects mentioned above are accomplished by the following aspects, (1) through (20), of this invention.

(1) A purifying catalyst for the exhaust gas from an internal combustion engine, containing rhodium, palladium, a cerium compound, and a refractory inorganic oxide as catalytic components, carried on a refractory carrier, and comprising at least two catalyst layers, i.e. a first catalyst layer containing the cerium compound and a second catalyst layer containing the palladium and containing the cerium compound in an amount of not more than 5% by weight as $CeO_2$ based on the amount of the second catalyst layer.

(2) A catalyst according to (1) above, wherein the first catalyst layer containing the cerium compound contains rhodium.

(3) A catalyst according to (1) above, wherein the rhodium content of the second catalyst layer containing the palladium is not more than 0.05% by weight based on the amount of the second catalyst layer.

(4) A catalyst according to (1) above, wherein the palladium content of the first catalyst layer containing the cerium compound is not more than 0.1% by weight based on the amount of the first catalyst layer.

(5) A catalyst according to (1) above, wherein the cerium compound and palladium are not substantially contained in one and the same catalyst layer.

(6) A catalyst according to (1) above, wherein the first catalyst layer containing the cerium compound forms an outer layer and the second catalyst layer containing the palladium an inner layer in the superposed catalyst layers.

(7) A catalyst according to (1) above, which contains platinum metals excluding rhodium and palladium.

(8) A catalyst according to (1) above, wherein the refractory inorganic oxide has a BET surface area in the range of 10 to 400 $m^2/g$.

(9) A catalyst according to any of (1) through (8) above, wherein the rhodium content is in the range of 0.01 to 2 g, the palladium content in the range of 0.1 to 20 g, the cerium compound content calculated as $CeO_2$ in the range of 1 to 100 g, and the refractory inorganic oxide content in the range of 10 to 300 g per liter of the catalyst.

(10) A catalyst according to (7) above, wherein the total content of platinum metals excluding rhodium and palladium is in the range of 0.01 to 5 g per liter of the catalyst.

(11) A catalyst according to (1) above, wherein the second catalyst layer containing the palladium further contains a cerium compound having a BET surface area of not more than 20 $m^2/g$ or a crystal diameter of not less than 200 Å as determined by XRD.

(12) A catalyst according to (11) above, wherein the first catalyst layer containing the cerium compound further contains rhodium.

(13) A catalyst according to (11) above, wherein the rhodium content of the second catalyst layer containing the palladium is not more than 0.05% by weight based on the amount of the second catalyst layer.

(14) A catalyst according to (11) above, wherein the palladium content of the first catalyst layer containing the cerium compound is not more than 0.1% by weight based on the amount of the first catalyst layer.

(15) A catalyst according to (11) above, wherein the cerium compound and palladium are not substantially contained in one and the same catalyst layer.

(16) A catalyst according to (11) above, wherein the first catalyst layer containing the cerium forms an outer layer and the second catalyst layer containing the palladium an inner layer in the superposed catalyst layers.

(17) A catalyst according to (11) above, which contains platinum metals excluding rhodium and palladium.

(18) A catalyst according to (11) above, wherein the refractory inorganic oxide has a BET surface area in the range of 10 to 400 m²/g.

(19) A catalyst according to any of (11) through (18) above, wherein the rhodium content is in the range of 0.01 to 2 g, the palladium content in the range of 0.1 to 20 g, the cerium compound content calculated as $CeO_2$ in the range of 1 to 100 g, and the refractory inorganic oxide content in the range of 10 to 300 g per liter of the catalyst.

(20) A catalyst according to (17) above, wherein the total content of platinum metals excluding rhodium and palladium is in the range of 0.01 to 5 g per liter of the catalyst.

The catalyst of this invention, when used in the internal combustion engine of an automobile, for example, exhibits an excellent purifying ability in quick response to the atmosphere of the exhaust gas which varies largely with changes in the operating condition of the engine involving such phases as idling, acceleration, constant-speed drive, and deceleration, particularly an excellent purifying ability in quick response to $NO_x$. It is exceptionally useful for the purification of the exhaust gas from an internal combustion engine.

DESCRIPTION OF THE PREFERRED EMBODIMENT

Now, this invention will be described in detail below.

The purifying catalyst of this invention for the exhaust gas from an internal combustion engine contains rhodium, palladium, a cerium compound, and a refractory inorganic oxide as catalyst components and has formed on a refractory carrier at least two catalyst layers, i.e. a first catalyst layer containing the cerium compound and a second catalyst layer containing palladium.

The cerium compounds which are effectively used in this invention include oxides, carbonates, and sulfate products, for example. Among other cerium compounds cited above, the oxides prove particularly advantageous. The cerium oxides are not particularly limited so long as they have been obtained by calcining corresponding water-insoluble salts or water-soluble salts. The content of the cerium compound calculated as $CeO_2$ (hereinafter referred to "calculated as $CeO_2$") in the catalyst is appropriately in the range of 1 to 100 g, preferably 1 to 80 g, per liter of the catalyst. If the content of the cerium compound is less than 1 g, the catalyst will be deficient in the catalytic ability. If it exceeds 100 g, the excess will impair the economy of the catalyst without bringing about a proportionate addition to the effect thereof.

The palladium content in this invention appropriately is in the range of 0.1 to 20 g, preferably 0.1 to 15 g, per liter of the catalyst. If the palladium content is less than 0.1 g, the catalyst will be deficient in ability. If the content exceeds 20 g, the excess will impair the economy of the catalyst without bringing about a proportionate addition to the effect thereof. For this invention, the first catalyst layer containing the cerium compound mentioned above advantageously contain rhodium. The rhodium content in this invention is properly in the range of 0.01 to 2 g, preferably 0.02 to 1 g, per liter of the catalyst. If the rhodium content is less than 0.01 g, the catalyst will be deficient in ability. If the content exceeds 2 g, the excess will impair the economy of the catalyst without bringing about a proportionate addition to the effect thereof.

This invention prefers the second catalyst layer containing the palladium to avoid substantially containing rhodium. The expression "to avoid substantially containing rhodium" as used herein means that the rhodium content is not more than 0.05% by weight and preferably not more than 0.025% by weight based on the total weight of the relevant catalyst layer and especially that no rhodium is contained. If the rhodium content exceeds 0.05% by weight, the excess rhodium will react with palladium possibly to the extent of harming the ability of the catalyst.

This invention likewise prefers the first catalyst layer containing the cerium compound mentioned above to avoid substantially containing palladium. The expression "to avoid substantially containing palladium" as used herein means that the palladium content is not more than 0.1% by weight and preferably not more than 0.05% by weight based on the total weight of the relevant catalyst layer and especially that no palladium is contained. If the palladium content exceeds 0.1% by weight, the excess palladium will react with rhodium possibly to the extent of harming the ability of the catalyst.

This invention further prefers the second catalyst layer containing the palladium mentioned above to avoid substantially containing a cerium compound. The expression "to avoid substantially containing palladium" as used herein means that the cerium compound content is not more than 5% by weight and preferably not more than 3% by weight as $CeO_2$ based on the total weight of the relevant catalyst layer and especially that no cerium compound is contained. If the cerium compound content exceeds 5% by weight, the excess cerium compound will harm the catalyst by degrading the purifying ability in quick response to the $NO_x$ mentioned above.

Though the second catalyst layer containing palladium is preferred to avoid substantially containing a cerium compound as described above, it may contain such a specific cerium compound as will be described below.

Such cerium compound which is usable has a Brunauer-Emmett-Teller (BET) specific surface area of not more than 20 m²/g or a crystal diameter of not less than 200 Å as determined by an X-ray diffractometer (XRD with Cu—Ka as light source). If the specific surface area of the cerium compound exceeds 20 m²/g or the crystal diameter of the cerium compound as determined by the XRD is less than 200 Å, the cerium compound will be at a disadvantage in degrading the catalyst in the purifying ability in quick response. The cerium compound of a quality such that the specific surface area thereof may be not more than 20 m²/g or the crystal diameter thereof as determined by the XRD may be not less than 200 Å can be obtained by a method which comprises causing a cerium compound of a quality such that the specific surface area thereof may be not less than 20 m²/g or the crystal diameter thereof as determined by the XRD may be not more than 200 Å to undergo forcibly accelerated crystallization in an atmosphere of an elevated temperature or by a method which comprises hydrolyzing or precipitating a water-soluble salt of cerium prior to the preparation of a cerium compound and, while the product thereof is still in the form of a hydroxide or a hydrate, forcibly forming a cerium compound of the quality fulfilling the conditions mentioned above, for example.

The content of this specific cerium compound in the second catalyst layer is in the range of 3 to 80% by weight as $CeO_2$ based on the amount of the second catalyst layer, providing that this content should be calculated separately of the content of the cerium compound par liter of the catalyst mentioned above.

Further, this invention prefers the first catalyst layer containing the cerium compound mentioned above to avoid substantially containing palladium and the second catalyst layer containing the palladium mentioned above to avoid substantially containing the cerium compound. Specifically, it is particularly appropriate that neither of the two catalyst layers contains the cerium compound and palladium simultaneously.

The purifying catalyst of this invention for the exhaust gas from an internal combustion engine prefers the first catalyst layer containing the cerium compound mentioned above to form an outer layer and the second catalyst layer containing the palladium mentioned above to form an inner layer, respectively as deposited on a refractory carrier, particularly a refractory three dimensional carrier structure.

The purifying catalyst of this invention for the exhaust gas from an internal combustion engine may contain platinum metals excluding rhodium and palladium. The platinum metals excluding rhodium and palladium are platinum, iridium, etc. for example. The amount of the platinum metal to be used herein is properly in the range of 0.01 to 5 g, preferably 0.01 to 2 g, per liter of the catalyst. If the amount of the platinum metal to be used is less than 0.01 g, the catalyst will be deficient in ability. If this amount exceeds 5 g, the excess platinum metal will impair the economy of the catalyst without producing a proportionate addition to the effect thereof.

As concrete examples of the refractory inorganic oxide o be effectively used herein, activated aluminas such as γ-alumina, δ-alumina, η-alumina, and θ-alumina; α-alumina; silica; titania; and zirconia or complex oxides thereof such as silica-alumina, alumina-titania, alumina-zirconia, silica-titania, silica-zirconia, and titania-zirconia, and mixtures thereof maybe cited. These refractory inorganic oxides generally come in a powdery form. Appropriately, the Brunauer-Emmett-Teller (hereinafter referred to as "BET") specific surface area of the inorganic oxide is in the range of 10 to 400 $m^2/g$, preferably 20 to 300 $m^2/g$. The amount of the refractory inorganic oxide to be used herein is appropriately in the range of 10 to 300 g, preferably 50 to 250 g, per liter of the refractory three dimensional structure. If the amount to be used is less than 10 g/liter, the catalyst will fail to acquire a fully satisfactory catalytic ability. If this amount exceeds 300 g/liter, the excess will harm the catalyst by inducing an undue rise in back pressure.

The refractory three dimensional structure to be used herein may be a pelletized carrier or a monolithic carrier. This invention prefers the monolithic carrier to the pelletized carrier. As typical examples of the monolithic carrier, ceramic foam, open-flow type ceramic honeycomb, wall-flow type honeycomb monolith, open-flow type metal honeycomb, metallic foam, and metal mesh may be cited. Among other monolithic carriers mentioned above, the open-flow type ceramic honeycomb or the metallic honeycomb is used particularly advantageously. As concrete examples of the material used advantageously for the ceramic honeycomb carrier, cordierite, mullite, α-alumina, zirconia, titania, titanium phosphate, aluminum titanate, betalite, spondumen, aluminosilicate, and magnesium silicate may be cited. Among other materials mentioned above, those based on cordierite prove particularly advantageous. In the metal honeycomb carriers, those which are formed in a one body using such oxidation-resistant refractory metals as stainless steel and Fe—Cr—Al alloy are used particularly advantageously.

These monolithic carriers are manufactured by the extrusion molding technique or the technique of tightly rolling a sheet-like element. The mouths of these monolithic carriers for passing gas (cell shapes) may be in the form of hexagons, tetragons, triangles, or corrugations. The cell density (number of cells/unit cross section) in the range of 100 to 600 cells/square inch, preferably 200 to 500 cells/square inch, is sufficient for effective use.

The purifying catalyst of this invention for the exhaust gas from an internal combustion engine, when necessary, may incorporate therein an alkaline earth metal compound and a rare earth metal oxide for the purpose of enhancing the thermal stability of the refractory inorganic oxide. It may further incorporate therein iron, cobalt, or nickel exhibiting the oxygen storage ability, chromium, manganese, niobium, tungsten, zinc, gallium, germanium, indium, tin, bismuth, or alkali metal compounds.

Now, this invention will be described more specifically below with reference to working examples. It should be noted, however, that this invention is not limited to these examples.

EXAMPLE 1

An aqueous slurry was prepared by subjecting 1200 g of activated alumina (γ-$Al_2O_3$ with a BET specific surface area of 155 $m^2/g$, the remarks will apply invariably to the following examples and controls), aqueous solution of palladium nitrate containing 15 g of palladium, and deionized water added thereto to wet pulverization by the use of a ball mill. One liter of monolithic carriers made of cordierite (148 mm in major diameter, 84 mm in minor diameter, and 96 mm in length) and having 400 cells per square inch of cross section were immersed in the slurry. The wet monolithic carriers removed from the slurry were blown with compressed air to expel excess slurry, dried, and calcined at a temperature in the range of 500° C. for a period in the range of 1 hour to complete an inner catalyst layer.

Then, an aqueous slurry was prepared by subjecting 800 g of activated alumina, 200 g of commercially available cerium oxide ($CeO_2$ with a BET surface area of 149 $m^2/g$, the remarks will apply invariably to the following examples and controls), aqueous solution of rhodium nitrate containing 3 g of rhodium, and deionized water added thereto to wet pulverization by the use of a ball mill. One liter of the monolithic carriers of cordierite coated with the inner catalyst layer mentioned above were immersed in the aqueous slurry. The wet monolithic carriers removed from the slurry were blown with compressed air to expel excess slurry, dried, and calcined at a temperature of 500° C. for a period of 1 hour to form an outer catalyst layer and obtain a complete catalyst. The catalyst was found to contain in the inner layer 1.5 g of palladium and 120 g of activated alumina per liter of the carrier and in the outer layer 0.3 g of rhodium and 80 g of activated alumina per liter of the carrier as shown in Table 1.

EXAMPLE 2

An aqueous slurry for the formation of an inner catalyst layer was prepared by subjecting 1140 g of activated alumina, 60 g of cerium oxide, aqueous solution of palladium nitrate containing 15 g of palladium, and deionized water added thereto to wet pulverization by the use of a ball mill. Thereafter, a complete catalyst was obtained by preparing an inner catalyst layer and an outer catalyst layer by following the procedure of Example 1.

Control 1

An aqueous slurry for the formation of an inner catalyst layer was prepared by subjecting 800 g of activated alumina, 400 g of cerium oxide, aqueous solution of palladium nitrate containing 15 g of palladium, and deionized water added thereto to wet pulverization by the use of a ball mill. Thereafter, a complete catalyst was obtained by preparing an inner catalyst layer and an outer catalyst layer by following the procedure of Example 1.

Control 2

An aqueous slurry for the formation of an inner catalyst layer was prepared by subjecting 1100 g of activated alumina, 100 g of cerium oxide, aqueous solution of palladium nitrate containing 15 g of palladium, and deionized water added thereto to wet pulverization by the use of a ball mill. Thereafter, a complete catalyst was obtained by preparing an inner catalyst layer and an outer catalyst layer by following the procedure of Example 1.

Control 3

An aqueous slurry for the formation of an inner catalyst layer was prepared by subjecting 800 g of activated alumina, 400 g of cerium oxide, aqueous solution of dinitrodianmine-platinum containing 15 g of platinum, and deionized water added thereto to wet pulverization by the use of a ball mill. Thereafter, a complete catalyst was obtained by preparing an inner catalyst layer and an outer catalyst layer by following the procedure of Example 1.

The compositions of the catalysts prepared in the working examples and controls cited above are collectively shown in Table 1.

TABLE 1

| | Composition of inner catalyst layer (g/l) | | Composition of outer catalyst layer (g/l) | |
|---|---|---|---|---|
| | | $Al_2O_3$ | $CeO_2$ | | $Al_2O_3$ | $CeO_2$ |
| Example 1 | Pd = 1.5 | 120 | 0 | Rh = 0.3 | 80 | 20 |
| Example 2 | Pd = 1.5 | 114 | 6 | Rh = 0.3 | 80 | 20 |
| Control 1 | Pd = 1.5 | 80 | 40 | Rh = 0.3 | 80 | 20 |
| Control 2 | Pd = 1.5 | 110 | 10 | Rh = 0.3 | 80 | 20 |
| Control 3 | Pt = 1.5 | 80 | 40 | Rh = 0.3 | 80 | 20 |

Evaluation of Catalyst

The catalysts obtained in Examples 1 and 2 and Controls 1 through 3 were subjected to durability test in order to obtain catalyst performance. A sample catalyst was set in place in the exhaust system of a commercially available electronically controlled gasoline engine (8 cylinders, 4400 cc) and tested for durability to withstand the impact of the exhaust gas. The engine was driven in the mode of 60 seconds of constant-speed drive and 6 seconds of deceleration (during the course of the deceleration, the fuel supply was cut and the catalyst was exposed to the harsh condition of an oxidizing atmosphere at an elevated temperature) and the catalyst was left standing for 50 hours under the condition such that the exhaust gas temperature at the inlet to the catalyst might be 850° C. during the constant-speed drive. Then, the catalyst was set in place in a commercially available electronically controlled gasoline engine (4 cylinders, 2000 cc) and tested for catalyst performance using the 10.15 mode, the standard drive mode in Japan which repeats acceleration, deceleration, constant-speed drive, and idling. The results are shown collectively in Table 2.

TABLE 2

| | Purification ratio of CO (%) | Purification ratio of HC (%) | Purification ratio of NO (%) |
|---|---|---|---|
| Example 1 | 84 | 83 | 82 |
| Example 2 | 84 | 82 | 79 |
| Control 1 | 80 | 78 | 71 |
| Control 2 | 81 | 79 | 74 |

TABLE 2-continued

| | Purification ratio of CO (%) | Purification ratio of HC (%) | Purification ratio of NO (%) |
|---|---|---|---|
| Control 3 | 80 | 75 | 75 |

It is clearly noted from the data of Table 2 that, in the practical drive involving acceleration and deceleration and constant-speed drive, the catalysts of the working examples showed highly satisfactory ability to deprive the exhaust gas of $NO_x$ and of CO and HC as well, whereas the catalysts of the controls showed a problematic ability to deprive the exhaust gas particularly of $NO_x$.

EXAMPLE 3

A cerium oxide showing a specific surface area of 10 $m^2/g$ and a crystal diameter of about 400 Å was obtained by calcining commercially available cerium carbonate in an electric oven at 800° C. for 10 hours. An aqueous slurry was prepared by subjecting 400 g of the cerium oxide, 800 g of activated alumina ($\gamma$-$Al_2O_3$ with a BET specific surface area of 155 $m^2/g$, the remarks will apply invariably to the following examples and controls), aqueous solution of palladium nitrate containing 15 g of palladium, and deionized water added thereto to wet pulverization by the use of a ball mill. One liter of monolithic carriers made of cordierite (148 mm in major diameter, 84 mm in minor diameter, and 96 mm in length) and having 400 cells per square inch of cross section were immersed in the slurry. The wet monolithic carriers removed from the slurry were blown with compressed air to expel excess slurry, dried, and calcined at a temperature of 500° C. for a period of 1 hour to complete an inner catalyst layer.

Then, an aqueous slurry was prepared by subjecting 800 g of activated alumina, 200 g of commercially available cerium oxide ($CeO_2$ with a BET surface area of 149 $m^2/g$), rhodium nitrate containing 3 g of rhodium, and deionized water added thereto to wet pulverization by the use of a ball mill. One liter of the monolithic carriers of cordierite coated with the inner catalyst layer mentioned above were immersed in the aqueous slurry. The wet monolithic carriers removed from the slurry were blown with compressed air to expel excess slurry, dried, and calcined at a temperature of 500° C. for a period of 1 hour to form an outer catalyst layer and obtain a complete catalyst.

The purifying catalyst for the exhaust gas from an internal combustion engine was found to contain 1.5 g of palladium and 0.3 g of rhodium per liter of the refractory three dimensional structure.

EXAMPLE 4

A cerium oxide showing a specific surface area of 18 $m^2/g$ and a crystal diameter of about 210 Å was obtained by calcining the same cerium carbonate as used in Example 3 at 700° C. for 5 hours. Then, a complete catalyst was obtained by following the procedure of Example 1 while using the cerium oxide mentioned above as the cerium compound for the inner layer.

Control 4

A complete catalyst was obtained by following the procedure of Example 3 while using as the cerium compound for the inner layer the same commercially available cerium oxide used for the outer layer.

The compositions of the catalysts obtained in Examples 3 and 4 and Control 4 are shown in Table 3.

TABLE 3

| | Inner catalyst layer | | | | | Outer catalyst layer | | | | |
|---|---|---|---|---|---|---|---|---|---|---|
| | Platinum metal (g/l) | Al₂O₃ (g/l) | CeO₂ (g/l) | Specific surface area (m²/g) | Crystal diameter (Å) | Platinum metal (g/l) | Al₂O₃ (g/l) | CeO₂ (g/l) | Specific surface area (m²/g) | Crystal diameter (Å) |
| Example 3 | Pd = 1.5 | 80 | 40 | 10 | 400 | Rh = 0.3 | 80 | 20 | 149 | 100 |
| Example 4 | Pd = 1.5 | 80 | 40 | 18 | 210 | Rh = 0.3 | 80 | 20 | 149 | 100 |
| Control 4 | Pd = 1.5 | 80 | 40 | 149 | 100 | Rh = 0.3 | 80 | 20 | 149 | 100 |

Evaluation of Catalyst

The catalysts obtained in Examples 3 and 4 and Control 4 were subjected to practical service with an engine and then tested for catalyst performance. A sample catalyst was set in place in the exhaust system of a commercially available electronically controlled gasoline engine (8 cylinders, 4400 cc). and tested for durability to withstand the impact of the exhaust gas. The engine was driven in the mode of 60 seconds of constant-speed drive and 6 seconds of deceleration (during the course of the deceleration, the fuel supply was cut and the catalyst was exposed to the harsh condition of an oxidizing atmosphere at an elevated temperature) and the catalyst was left standing for 50 hours under the condition such that the exhaust gas temperature at the inlet to the catalyst might be 850° C. during the constant-speed drive. Then, the catalyst was set in place in a commercially available electronically controlled gasoline engine (4 cylinders, 2000 cc) and tested for catalyst performance using the 10.15 mode, the standard drive mode in Japan which repeats acceleration, deceleration, constant-speed drive, and idling. The results are shown collectively in Table 4.

TABLE 4

| | Purification ratio of CO (%) | Purification ratio of HC (%) | Purification ratio of NO (%) |
|---|---|---|---|
| Example 3 | 84 | 83 | 82 |
| Example 4 | 84 | 82 | 80 |
| Control 4 | 80 | 78 | 71 |

It is clearly noted from the data of Table 4 that, in the practical drive involving acceleration and deceleration and constant-speed drive, the catalysts of the working examples showed highly satisfactory ability to deprive the exhaust gas of $NO_x$ and of CO and HC as well, whereas the catalyst of the control showed a problematic ability to deprive the exhaust gas particularly of $NO_x$.

What is claimed is:

1. A catalyst for purifying the exhaust gas from an internal combustion engine, said catalyst containing rhodium, palladium, a cerium compound having a BET surface area of not less than 20 m²/g and a crystal diameter of not more than 200 A as determined by XRD, and a refractory inorganic oxide as catalyst components, carried on a refractory carrier, in at least a first catalyst superposed on a second inner catalyst layer, said first catalyst layer containing said rhodium, said cerium compound and substantially free of palladium, and said second catalyst layer containing said palladium containing said cerium compound in an amount of not more than 3% by weight as $CeO_2$ based on the weight of the second catalyst layer, and substantially free of rhodium.

2. A catalyst according to claim 1, wherein said second catalyst layer is free of said rhodium.

3. A catalyst according to claim 1, wherein said first catalyst layer is free of said palladium and said second catalyst layer is free of said rhodium.

4. A catalyst according to claim 1, wherein said refractory inorganic oxide has a BET surface area in the range of 10 to 400 m²/g.

5. A catalyst according to claim 1, wherein the rhodium is in the range of 0.01 to 2 g, the palladium content in the range of 0.1 to 20 g, and the refractory inorganic oxide content in the range of 10 to 300 g, per liter of the catalyst.

6. A catalyst according to claim 1, wherein said second catalyst layer containing said palladium further contains a relatively low surface area cerium compound having a BET surface area of not more than 20 m²/g or a crystal diameter of not less than 200 Å as determined by XRD.

7. A catalyst according to claim 6, wherein said first layer is free of palladium.

8. A catalyst according to claim 6, said second catalyst layer is free of said rhodium.

9. A catalyst according to claim 6, wherein said first catalyst layer is free of said palladium and said second catalyst layer does not contain said rhodium.

10. A catalyst according to claim 6, wherein said refractory inorganic oxide has a BET surface area in the range of 10 to 400 m²/g.

11. A catalyst according to claim 6, wherein the rhodium content is in the range of 0.01 to 2 g, the relatively low surface area cerium compound content calculated as $CeO_2$ in the range of 1 to 100 g, and the refractory inorganic oxide content in the range of 10 to 300 g, per liter of the catalyst.

* * * * *